J. J. DARROW.
LAWN SPRINKLER.
APPLICATION FILED AUG. 24, 1907.
902,863.
Patented Nov. 3, 1908.
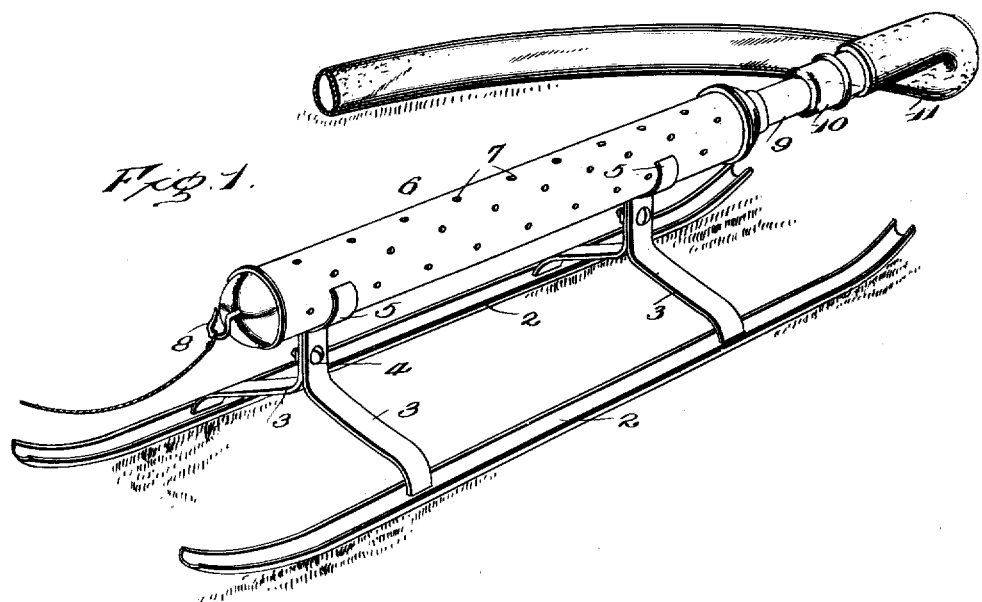
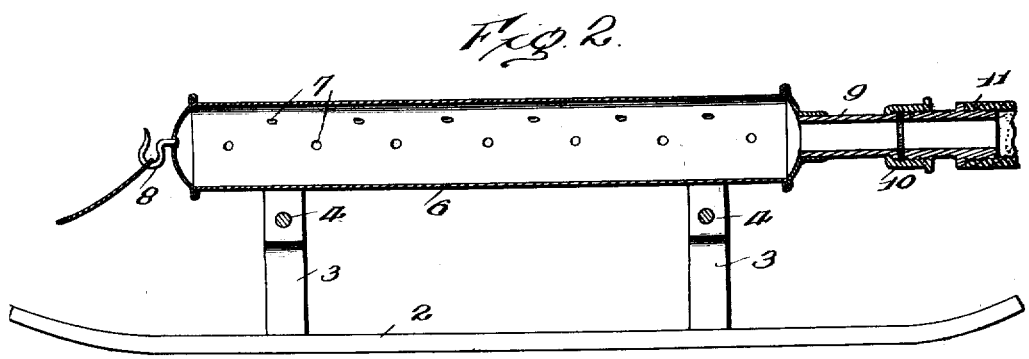
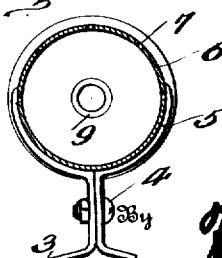
Inventor
J. J. Darrow

UNITED STATES PATENT OFFICE.

JAMES J. DARROW, OF ASHERVILLE, KANSAS.

LAWN-SPRINKLER.

No. 902,863.  Specification of Letters Patent.  Patented Nov. 3, 1908.

Application filed August 24, 1907. Serial No. 389,979.

*To all whom it may concern:*

Be it known that I, JAMES J. DARROW, a citizen of the United States, residing at Asherville, in the county of Mitchell and State of Kansas, have invented certain new and useful Improvements in Lawn-Sprinklers, of which the following is a specification.

This invention contemplates certain new and useful improvements in lawn sprinklers and the invention has for its object a device of this character which is so arranged that it may be readily drawn over the grass and effectually sprinkle the same, the water issuing from the spray drum or nozzle in fine jets, simulating to the best possible degree a rain fall. With this and other objects in view, as will more fully appear as the description proceeds, the invention consists of the parts that I shall hereinafter fully describe and claim.

For a full understanding of the invention, reference is to be had to the following description and accompanying drawing, in which:

Figure 1 is a perspective view of my improved lawn sprinkler. Fig. 2 is a longitudinal sectional view thereof. Fig. 3 is a transverse section.

Corresponding and like parts are referred to in the following description and indicated in all the views of the drawings by the same reference characters.

My improved lawn sprinkler comprises a traveling support 1 which consists of two sled runners 2, each of which is formed with a pair of inwardly and upwardly extending arms 3. The arms of one pair extend towards the arms of the other pair and are provided with upwardly extending portions 3 adapted to abut against each other as shown, clamp screws or bolts 4 passing through the said abutting portions of the two pairs of arms, to secure the parts of the framework or support together.

The upper ends of the arms are bowed, as indicated at 5, to partially encircle and form sockets for the spraying drum 6, which is cylindrical as shown, and which is provided with a plurality of jet orifices 7 so as to form the water issuing therethrough into a comparatively large number of finely divided jets spread or flared out over a comparatively large surface.

The front end of the drum or nozzle 6 is provided with an eye 8 so that a cable or rope may be attached thereto to draw the nozzle, held on the support 1, from place to place over the lawn. The rear end of the nozzle 6 is provided with a nipple extension 9. Said extension carries a swivel coupling 10 by which the nozzle may be detachably secured to a hose or other flexible supply pipe 11, which conveys the water to the nozzle from any suitable source of supply, (not shown).

From the foregoing description in connection with the accompanying drawing, it will be seen that I have provided a very simple and efficient device for sprinkling lawns, which is portable and may be easily drawn from place to place over the lawn, which will cover with its diverging jets a comparatively wide expanse of lawn in its operation, and in which the bowed ends of the arms 3 securely hold the cylindrical nozzle 6 by partially encircling same, and yet in such manner that the nozzle may be easily detached if desired for the purpose of repair or any other purpose, and which permits the nozzle to be turned axially in the said arms whenever it is desired to direct a plurality of jets to one side or the other or adjust the device with the maximum number of jets projecting upwardly in a true vertical direction so as to simulate, when desired, the action of a rain fall to the best possible advantage.

Having thus described the invention, what is claimed as new is:

1. A device of the character described, comprising a cylindrical spray nozzle provided in its periphery with a plurality of jet orifices, means for attaching one end of said nozzle to a supply hose an eye secured to the other end of said nozzle for the attachment of a cable thereto, and a traveling support for said nozzle, the said support consisting of a pair of sled runners, converging arms secured to and projecting upwardly from the respective runners, said arms being provided with abutting upwardly extending portions and bowed upper ends partially encircling the nozzle and holding the same, and clamping screws extending through the upwardly extending portion of the arms.

2. A lawn sprinkler comprising a nozzle and a support therefor, said support consisting of a pair of sled runners, two pairs of arms secured to and projecting upwardly from said sled runners, one pair of arms being in advance of and spaced from the other pair of arms, the arms of each pair converging upwardly and provided with abutting upwardly extending portions and outwardly bowed upper ends partially encircling the nozzle, and clamping screws extending through the abutting portions of the arms.

In testimony whereof I affix my signature in presence of two witnesses.

JAMES J. DARROW. [L. S.]

Witnesses:
JOSEPH M. SHULL,
CHARLIE F. SHULL.